UNITED STATES PATENT OFFICE.

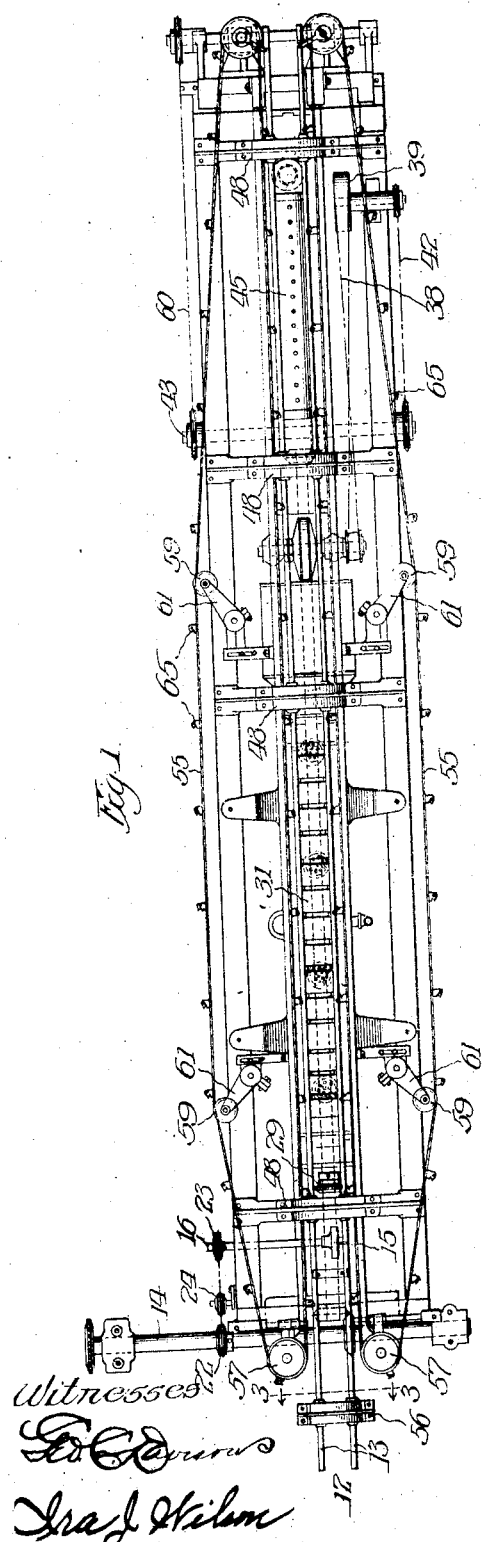

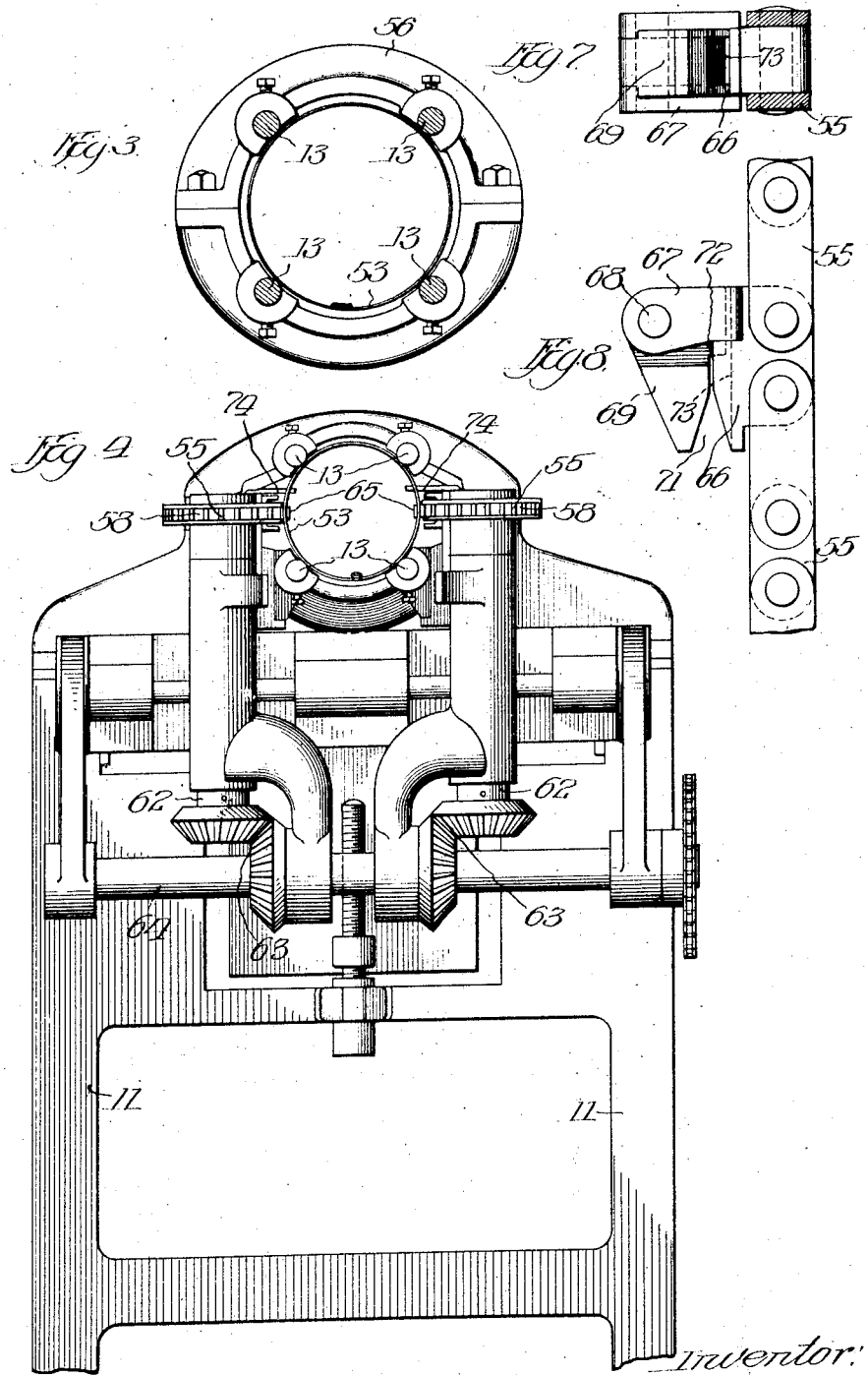

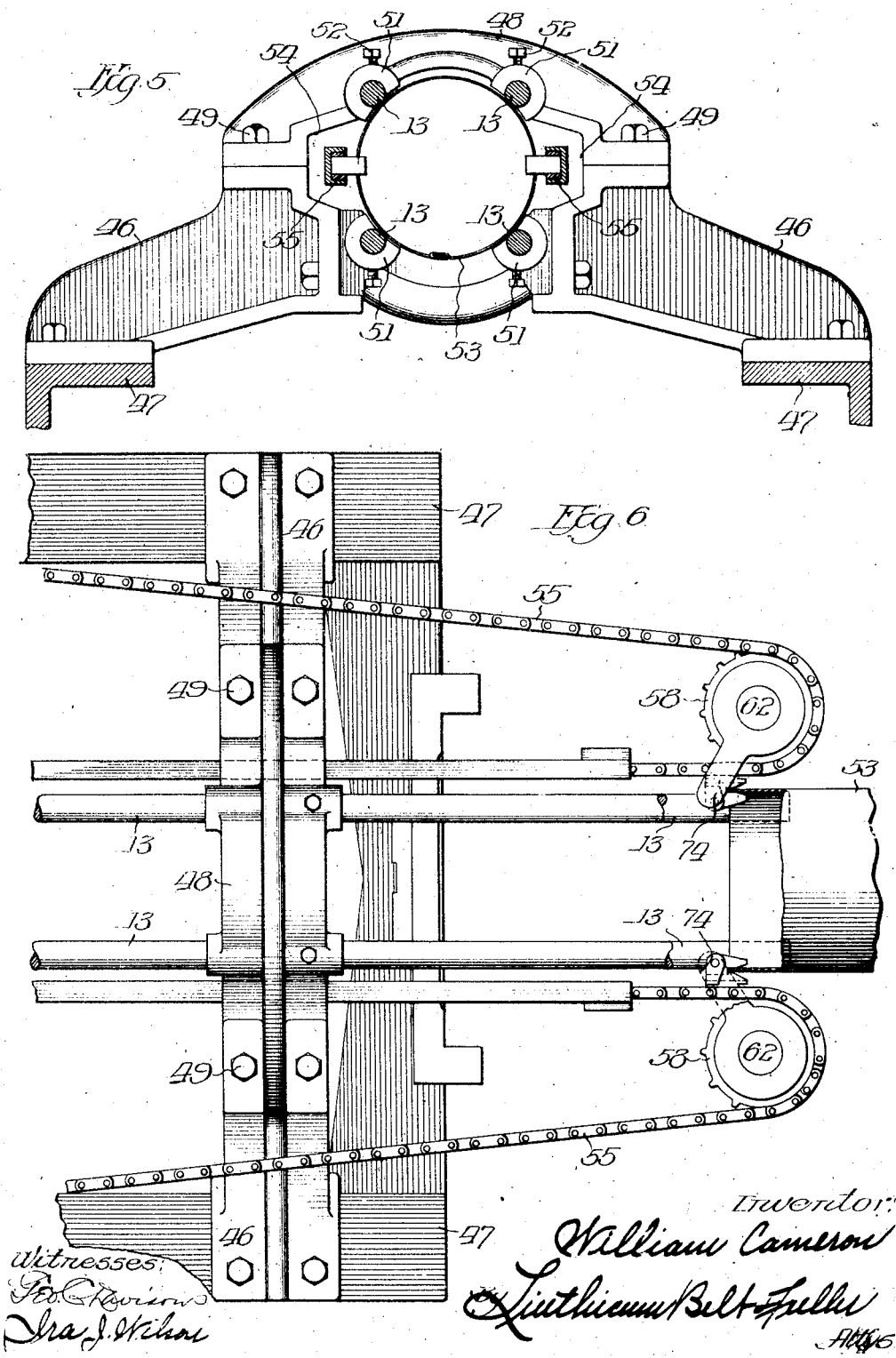

WILLIAM CAMERON, OF CHICAGO, ILLINOIS.

CAN-SOLDERING MACHINE.

1,223,557.  Specification of Letters Patent.  Patented Apr. 24, 1917.

Application filed December 10, 1913. Serial No. 805,686.

*To all whom it may concern:*

Be it known that I, WILLIAM CAMERON, a citizen of the United States, residing at Chicago, in the county of Cook and State of Illinois, have invented certain new and useful Improvements in Can-Soldering Machines, of which the following is a specification.

This invention relates in general to soldering machines and has more particular reference to side seam soldering mechanism to be used as accessory to or in conjunction with a lock seam machine.

In the manufacture of tin cans, to be used for canning vegetables, fruits and the like, the can bodies are first formed from a sheet of metal, the edges of which are secured together by a lock seam in a lock seaming machine. In order to produce an air tight can it is essential that this lock seam be soldered, and my present invention is designed to provide novel and improved mechanism for soldering this side seam.

Prior to my invention the soldering mechanism has comprised a long horn or guide upon which the can bodies were received as they were delivered from the lock seamer, this horn being constructed to fit the interior of the can bodies so that it would guide the cans as they were conveyed through the machine past the acid bath, the soldering device and the surplus solder remover. Because of the danger of the formation of poisonous acids from direct contact of fruits or vegetables with tin it is now customary to enamel or shellac the interior of the can bodies so that the can contents are precluded from contacting directly with the tin. The enameling is done before the can bodies are formed with the result that the bodies are enameled on the inside when they reach the side seam soldering mechanism. It frequently happens that in the passage of the bodies through this mechanism the horn projecting through the bodies and upon which the bodies are guided breaks the enamel or scrapes off a portion of it, leaving the tin exposed so that in cans thus injured the advantage of enameling is entirely lost for the reason that the exposed portions of the tin come in direct contact with the can contents. Furthermore, the acid bath, from which acid is applied to the seam previous to the application of the solder, is mounted directly beneath the horn and the acid fumes collect upon the horn with the result that more or less acid is transferred to the interior of the can and renders the cans not only unsanitary but positively dangerous when they are filled with certain classes of food stuffs.

One of the primary objects of my present invention is to overcome the objections to soldering mechanisms above noted, by providing a horn which contacts with the exteriors only of the can bodies so that the enamel on the inside is not cracked, scraped or injured in any manner and no acid is transferred to the interiors of the cans passing through the machine.

Another object of the invention is the provision of improved mechanism for conveying the cans through the machine and for holding them against turning movement during their travel. A further object is the provision of mechanism for releasing the cans from the conveyer mechanism at the delivery end of the machine so that the cans will not be injured or distorted before deliverance.

Other objects and many of the attendant advantages of this invention will be apparent as the same becomes better understood by reference to the following description, when considered in connection with the accompanying drawings. Referring to the drawings, Figure 1 is a plan view of a soldering machine embodying my invention;

Fig. 2 is a side elevation thereof;

Fig. 3 is a sectional view taken on the line 3—3 of Fig. 1;

Fig. 4 is an end elevation of the rear end of the machine;

Fig. 5 is a side view of one of the horn holders taken substantially on the line 5—5 of Fig. 2;

Fig. 6 is an enlarged fragmentary plan view of the delivery end of the machine;

Fig. 7 is a sectional view through one of the chain carriers, showing a face view of one of the gripping devices, and Fig. 8 is a plan view of the parts shown in Fig. 7.

On the drawings reference character 9 indicates the base of the machine, provided with a plurality of uprights or standards 11 upon which the various operating mechanisms to be hereinafter described are carried. The can bodies are fed to the left hand end of the machine, viewing Figs. 1 and 2, preferably directly from the lock seamer, and are conveyed past the acid applier, the soldering device, the surplus solder remover and the cooling appliance, by transferring mechanism acting in conjunction with a guiding horn of novel construction, both of which will be hereinafter described in detail. For the present it is sufficient to say that the horn, which is designated generally by reference character 12, comprises a plurality of parallel rods, or guiding members, 13 extending throughout the length of the machine and directly above the various appliances which operate upon the cans as they travel through the horn.

The machine is operated from a suitable source of power which is connected by a belt or chain to the main drive shaft 14 extending transversely of the machine at the front end thereof. The can bodies are fed to the machine endwise, with the lock seam down, and are first subjected to an application of acid along the seam by means of a rotary wheel 15 carried upon a suitable shaft 16 and partially submerged in acid contained in a tank 17 supported upon a bracket 18 which is adjustably carried by one of the uprights 11 of the main frame and may be adjusted vertically to accommodate the wheel to cans of various sizes by means of an adjusting screw 19. The shaft 16 is driven in the direction of travel of the cans by a cross belt 21 trained around pulleys 22 and 23 fixed on the shafts 14 and 16 repectively, a suitable belt tightener 24 being employed to maintain the desired tension on the belt if required.

A longitudinally extending counter shaft 25 mounted in suitable bearings is driven from the shaft 14 through the bevel gears 26. This shaft is equipped with a sprocket wheel 27 which through a chain 28, drives a sprocket wheel 29 fixed on the soldering roll 31 mounted beneath the horn and adapted to be rotated in a bath of molten solder which is maintained in molten condition by suitable gas burners 32 fed from a gas pipe 33. This soldering roll, which may be of any well known or preferred construction, is adapted to apply a thin film of solder to the seam of each can body as the can travels along in proximity to or in contact with the roll.

The surplus solder adhering to the can body after leaving the soldering roll is removed by a brush or faced roller 34 mounted in a bracket 35 supported on an upright 11 and adjustable to cans of various sizes by means of a screw 36. This brush or roller is rotated in a direction opposite to the direction of travel of the cans and the surplus solder removed by the brush is deposited in a receptacle 37. The roller 34 is driven by means of a belt 38 from a pulley 39 mounted on a shaft 41, which in turn is driven by a chain 42 from a cross shaft 43 driven from the shaft 25 by means of beveled gears 44.

After the surplus solder is removed the can is cooled for the purpose, first, of setting the solder, and second, to render the can cool enough to be handled, by means of a perforated cooling pipe 45 connected with a fan or other air blast (not shown).

Instead of employing a guiding horn which enters the interior of the can, as has been previously done, I have devised and have equipped my machine with a novel horn which will now be described. At intervals upon the frame of the machine I have mounted holders, as shown in Fig. 5, each comprising a lower portion 46 bolted or otherwise secured to the horizontally extending portion 47 of the main frame, and an upper portion 48 secured by bolts 49 or otherwise to the lower portion. Both portions of the holders are equipped with sockets 51 adapted to receive and support the rods 13 which are held in position in the various sockets by set screws 52. These rods, four of which are shown in the present instance, although a greater or less number may be used as desired, are spaced apart to accommodate a can body 53 between them and to firmly contact with the periphery of such can bodies as the cans travel longitudinally through the horn. By this improved horn the can bodies are supported and guided during their travel through the machine wholly from the outside, so that there is no danger or liability of cracking, scraping or otherwise injuring the enamel on the inside of the bodies. It will be observed from Fig. 5 that the holder is formed at each side to provide a pocket or race-way 54 through which the chain carriers or conveyers 55 are adapted to travel. Since the conveyers, as will be evident from Figs. 1 and 2, do not extend entirely to the receiving end of the horn, the holder 56, as best shown in Fig. 3, does not have any pocket or race-way and is simply employed to maintain the ends of the horn rods 13 in proper relation.

The endless chain conveyers 55, of which two are shown, are trained over idler sprockets 57 at the feed end of the machine and over drive sprockets 58 at the delivery end of the machine, the carriers being supported intermediate their ends by idlers 59 maintained upon the ends of adjustable arms 61 carried by the main frame. The drive sprockets 58 are mounted on the upper ends of vertical shafts 62 (Fig. 4) which are driven through the intermediary of bevel gears 63 from a cross shaft 64 which in turn is driven by a chain 60 from the cross shaft 43. Since the sprockets 58 are both driven at the same speed it will be manifest that the conveyers 55 will both travel in unison and at the same speed.

In order that the conveyers may engage with the can bodies to convey them along the horn I have mounted upon each conveyer at predetermined intervals a gripper 65, the details of which are best shown in Figs. 7 and 8. As will be evident from these figures each gripper comprises a stationary jaw 66 having outstanding lugs 67 between which is pivotally mounted on a pin 68 a movable jaw 69. The front ends of these jaws are inclined to provide a tapered slot 71 into which the rear edge of the can body projects as the gripper is brought into operative relation therewith upon movement of the conveyer. In order to assist in holding the cans against rotation during their travel through the horn the movable jaw 69 is provided with a downwardly extending shoulder 72 which, when engaged by the rear edge of the can body, causes the jaw 69 to rock on its pivot and clamp the can firmly between the movable and stationary jaws. From Fig. 7 it will be observed that the stationary jaw is provided with a groove 73 so that the can body is gripped by the edges or sides of the jaws only, thereby providing two points of engagement between each gripper and the can which securely holds the can against rotation without bending or distorting the can. It will be evident, therefore, that as the can bodies are fed into the horn they are engaged in succession by the grippers on the conveyers and are transported through the horn over the various operating mechanisms and at the same time are held against rotation so that the lock seam will be at the bottom to receive the various operations to which it is subjected.

It will be manifest from Fig. 6 that when the grippers reach the delivery end of the horn they pass around the drive sprockets 58 and return to the feed end of the machine outside the horn. In order to release the cans from the grippers so that the cans will not be torn or bent by the separation of the pairs of grippers as they travel around the sprockets, I have provided means for disengaging the cans from the grippers before the arcuate movement of the grippers occurs. This means comprises in the present instance an arm 74 fastened on each shaft 62 and of sufficient length to project beyond the conveyer chains into the path of travel of cans in the horn. The circumference of each sprocket wheel 58 is equal to the distance between the successive grippers on the chain so that a can is delivered at each rotation of the shafts 63. By adjusting the chains on the sprocket wheels when the machine is assembled so that the arm 74 will bear a predetermined relation to the grippers on the chains, as shown in Fig. 6, the arms will be brought into engagement with the rear ends of the can bodies 53 just as a pair of grippers is approaching a sprocket 58, with the result that further movement of the arms will push the can bodies out of the grippers before the grippers begin to travel around the sprockets, thereby releasing the cans and obviating any danger of injury by the grippers. If preferred the arms 74 may be adjustably mounted on the shafts 62 so that they can be adjusted to the requisite position with respect to the grippers on the chains. When the can bodies are released from the grippers they are discharged from the delivery end of the horn. The can bodies when delivered are, by reason of the air blast delivered from the cooling pipe 45, sufficiently cooled to be handled and the solder is thoroughly set.

My invention and its mode of operation should be fully understood from the foregoing without further description and while I have illustrated and described that embodiment of my invention which at present seems preferable it will be obvious that the mechanical details disclosed are capable of considerable variation and modification without departing from the spirit of the invention or sacrificing any of its material advantages.

I claim:

1. In a can soldering machine, the combination of a frame, a can supporting and guiding horn comprising a plurality of parallel members adapted to engage the exteriors of the cans, mechanism for conveying the cans through said horn, and an arm rotatable about a fixed pivotal axis for positively discharging the cans from said mechanism at the delivery end of the horn.

2. In a can soldering machine, the combination of a horn conveyer mechanism for conveying cans along said horn, said mechanism including a series of can gripping devices, and an arm rotatable about a fixed pivotal axis at the discharge end of said horn for positively discharging the cans from said devices.

3. In a can soldering machine, the combination of a horn, an endless conveyer, means carried by said conveyer in position to engage a can and convey the same along the horn, and arms rotatable about fixed pivotal axes and intermittently projected into the path of travel of the cans for positively discharging the cans from opposite sides of said path from said conveyer.

4. In a can soldering machine, the combination of a guiding horn, conveyer mechanism for conveying cans longitudinally of said horn, and arms rotatable about fixed pivotal axes on opposite sides of said guiding horn for positively discharging the cans from said conveyer mechanism at the delivery end of the horn.

5. In a can soldering machine, the combination of a horn, a sprocket wheel mounted adjacent each end of said horn, a chain conveyer trained over said sprocket wheel to travel adjacent to said horn, can engaging means carried by said chain, and a device mounted concentrically with the sprocket wheel at the delivery end of the horn adapted to positively discharge the cans from said can engaging means.

6. In a can soldering machine, the combination of a horn, a sprocket wheel mounted adjacent each end of said horn, a chain conveyer trained over said sprocket wheels to travel adjacent to said horn, can engaging means carried by said chain, and an arm mounted concentrically with the rear sprocket wheel to engage with the rear edge of a can at each rotation of the sprocket wheel whereby said cans are released from said conveyer mechanism.

7. In a can soldering machine, the combination of a guiding horn, mechanism for conveying cans through said horn, and arms rotatable about fixed pivotal axes on opposite sides of said guiding horn synchronously with the movement of the cans for positively discharging the cans from said conveyer mechanism at the delivery end of the horn.

8. In a can soldering machine, the combination of a horn, a pair of shafts mounted adjacent the delivery end of the horn, sprocket wheels fixed on said shafts, chains trained over said wheels, gripper devices carried by said chains to engage with and propel cans through the horn, and arms fixed on said shafts adapted to engage with the rear end of a can upon each rotation of said shafts whereby to release the can from said gripper devices.

WILLIAM CAMERON.

Witnesses:
IRA J. WILSON,
M. A. KIDDIE.